(12) United States Patent
Takeshita et al.

(10) Patent No.: US 11,881,675 B2
(45) Date of Patent: Jan. 23, 2024

(54) OPTICAL AMPLIFICATION DEVICE, OPTICAL TRANSMISSION SYSTEM, AND OPTICAL AMPLIFICATION METHOD

(71) Applicant: NEC Corporation, Tokyo (JP)

(72) Inventors: Hitoshi Takeshita, Tokyo (JP); Keiichi Matsumoto, Tokyo (JP); Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 283 days.

(21) Appl. No.: 17/601,152

(22) PCT Filed: Apr. 2, 2020

(86) PCT No.: PCT/JP2020/015186
§ 371 (c)(1),
(2) Date: Oct. 4, 2021

(87) PCT Pub. No.: WO2020/209170
PCT Pub. Date: Oct. 15, 2020

(65) Prior Publication Data
US 2022/0166179 A1     May 26, 2022

(30) Foreign Application Priority Data
Apr. 8, 2019  (JP) ................................ 2019-073237

(51) Int. Cl.
*H04B 10/291* (2013.01)
*H01S 3/067* (2006.01)
(Continued)

(52) U.S. Cl.
CPC ...... *H01S 3/06754* (2013.01); *G02B 6/02042* (2013.01); *H01S 3/13013* (2019.08); *H04B 10/2912* (2013.01)

(58) Field of Classification Search
CPC ............ H01S 3/06754; H01S 3/13013; G02B 6/02042; H04B 10/2912
(Continued)

(56) References Cited

U.S. PATENT DOCUMENTS

| 11,256,026 B2* | 2/2022 | Hayashi ............ G02B 6/03633 |
| 2013/0136404 A1 | 5/2013 | Feuer |

(Continued)

FOREIGN PATENT DOCUMENTS

| JP | 2013-522914 A | 6/2013 |
| JP | 2014-503081 A | 2/2014 |

(Continued)

OTHER PUBLICATIONS

International Search Report for PCT Application No. PCT/JP2020/015186, dated Jul. 7, 2020.

(Continued)

*Primary Examiner* — Mohammad R Sedighian
(74) *Attorney, Agent, or Firm* — Sughrue Mion, PLLC (57) ABSTRACT

It is difficult to construct an optical fiber transmission system enabling relay optical amplification using a coupled multi-core optical fiber as an optical transmission path; therefore, an optical amplification device includes first optical spatial layout converting means for converting a spatial layout of a plurality of optical signal beams propagating through each of a plurality of cores, from a coupled state in which optical signal beams interfere between a plurality of cores to a non-coupled state in which optical signal beam interference is reduced between a plurality of cores; optical amplifying means for amplifying, in the non-coupled state, the plurality of optical signal beams with the non-coupled state and generating a plurality of amplified optical signal beams; and second optical spatial layout converting means for convert- (Continued)

ing a spatial layout of the plurality of amplified optical signal beams from the non-coupled state to the coupled state.

20 Claims, 8 Drawing Sheets

(51) Int. Cl.
*H01S 3/13* (2006.01)
*G02B 6/02* (2006.01)

(58) Field of Classification Search
USPC .......................................................... 398/143
See application file for complete search history.

(56) References Cited

U.S. PATENT DOCUMENTS

| | | | |
|---|---|---|---|
| 2014/0036351 A1 | 2/2014 | Fini et al. | |
| 2018/0341120 A1 | 11/2018 | Zhang et al. | |
| 2022/0115830 A1* | 4/2022 | Yanagimachi | H04B 10/2581 |

FOREIGN PATENT DOCUMENTS

| | | | | |
|---|---|---|---|---|
| JP | 2015-510253 A | 4/2015 | | |
| JP | 2016-151716 A | 8/2016 | | |
| JP | 2017-21070 A | 1/2017 | | |
| JP | 2017-072818 A | 4/2017 | | |
| JP | 2017-223967 A | 12/2017 | | |
| JP | 6372598 B2 | 8/2018 | | |
| WO | WO 2020/080254 A1 * | 4/2020 | ............... | G02B 6/26 |

OTHER PUBLICATIONS

English translation of Written opinion for PCT Application No. PCT/JP2020/015186, dated Jul. 7, 2020.
Japanese Office Communication for JP Application No. 2021-513602 dated Sep. 20, 2022 with English Translation.

* cited by examiner

OPTICAL AMPLIFICATION DEVICE, OPTICAL TRANSMISSION SYSTEM, AND OPTICAL AMPLIFICATION METHOD

This application is a National Stage Entry of PCT/JP2020/015186 filed on Apr. 2, 2020, which claims priority from Japanese Patent Application 2019-073237 filed on Apr. 8, 2019, the contents of all of which are incorporated herein by reference, in their entirety.

TECHNICAL FIELD

The present invention relates to an optical amplification device, an optical transmission system, and an optical amplification method, and more specifically, relates to an optical amplification device, an optical transmission system, and an optical amplification method that use a multi-core optical fiber.

BACKGROUND ART

With rapid expansion of mobile traffic and video services and the like, expansion of a communication capacity in a core network has been required. The requirement of the capacity expansion tends to continue from now on. Expansion of a communication capacity has been achieved so far by using a time-multiplexing technique and a wavelength-multiplexing technique. The time-multiplexing technique and the wavelength-multiplexing technique have been applied to an optical communication system based on a single-core optical fiber.

When a single-core optical fiber is used, a multiplexing number of optical signals transmittable through a single core, i.e., a single optical fiber core is limited, and in recent years, is reaching the limitation. Limitation of the multiplexing number is determined based on a wavelength bandwidth usable in optical fiber communication, and an input-light-intensity bearing force of a single-core optical fiber.

In such a situation, in order to further expand a communication capacity, a spatial multiplexing technique being a multiplexing technique based on a dimension different from a multiplexing technique so far has been developed. The spatial multiplexing technique includes a multi-core technique for increasing the number of cores per optical fiber and a multi-mode technique for increasing the number of propagation modes. Both of the number of cores and the number of modes being used in conventional optical fiber communication are one. Therefore, a communication capacity is dramatically expandable by increasing the number of cores and the number of modes.

However, when the number of cores and the number of modes in an optical fiber are increased, it is difficult to directly use an optical transmitter/receiver and an optical amplifier widely prevailing currently. The reason is that an optical transmitter/receiver and an optical amplifier currently prevailing have been developed for a single-core optical fiber, and therefore are incompatible with a multi-core optical fiber and a multimode optical fiber. Therefore, a technique for achieving an optical transmitter/receiver and an optical amplifier being suitable for a multi-core optical fiber and a multimode optical fiber has been proposed.

The multi-core optical fiber includes two types being a coupled type and a non-coupled type. A non-coupled multi-core optical fiber has a large distance (pitch) between cores and therefore has an advantage that an influence due to crosstalk between cores is negligible. However, it is difficult to dispose cores densely, and therefore there is a disadvantage that it is difficult to increase the number of cores. In contrast, a coupled multi-core optical fiber has, as opposed to the non-coupled multi-core optical fiber, a small distance (pitch) between cores (see, for example, PTL 1). Therefore, while there is a disadvantage that an influence due to crosstalk between cores is increased, cores can be densely disposed, and therefore there is an advantage that the number of cores can be easily increased. The coupled multi-core optical fiber is subjected to an influence due to a non-linear optical effect less than the non-coupled multi-core optical fiber and therefore has an excellent optical transmission characteristic capable of increasing a transmission distance of an optical signal. The characteristic is a very large advantage in constructing a long-range optical transmission system.

An optical amplification method suitable for a multi-core optical fiber includes two methods being a core-pumping method and a clad-pumping method. The core-pumping method individually amplifies, by using an individual pumping light source for each core, an intensity of an optical signal optically transmitted through each core. The clad-pumping method collectively amplifies, by using a common pumping light source, an intensity of an optical signal optically transmitted through each core. The clad-pumping method can be used even when either of a non-coupled multi-core optical fiber and a coupled multi-core optical fiber is used.

In order to efficiently amplify an optical intensity of an optical signal transmitted through a multi-core optical fiber, a clad-pumping method that collectively amplifies, by using a common pumping light source, an intensity of an optical signal optically transmitted through each core is desirable. With regard to the clad-pumping method, in principle, a configuration of an optical amplifier based on a conventional single-core-pumping method can be directly used as a configuration of an optical amplifier based on the clad-pumping method.

One example of an optical amplifier based on such a clad-pumping method is described in PTL 2.

A related optical amplifier described in PTL 2 includes a multi-core optical fiber 91, a pumping light source 92, an optical isolator 94, an optical multiplexer 93, and multi-core optical fibers 97#1 and 97#2. Herein, in the multi-core optical fiber 91, a plurality of cores 11 doped with rare-earth ions are disposed in a first clad 12, and a second clad 13 that is disposed in a periphery of the first clad 12 and reflects pumping light having a wavelength of pumping the rare-earth ions is included. The plurality of cores 11 are configured in such a way as to have an inter-core distance where propagation light is coupled.

In this manner, the related optical amplifier uses coupling among cores 11#1 to 11#6 included in the multi-core optical fiber 91, and therefore when propagation light in the multi-core optical fiber 91 is amplified, it is assumed that occurrence of a gain difference between the cores 11 can be reduced.

CITATION LIST

Patent Literature

[PTL 1] Japanese Registered Patent Publication No. 6372598
[PTL 2] Japanese Unexamined Patent Application Publication No. 2017-21070

SUMMARY OF INVENTION

Technical Problem

As described above, when as an optical transmission path, a coupled multi-core optical fiber is used, an influence of a non-linear optical effect is decreased, and therefore a distance where an optical signal is transmittable can be extended. This is a very large advantage to an optical transmission system.

In contrast, an optical transmission system currently prevailing uses, as an optical transmission path, a single-core/single-mode optical fiber and uses a relay optical amplifier using a single-core/single-mode optical fiber. Therefore, when a coupled multi-core optical fiber in which a transmission distance can be extended is used as a transmission path, it is desirable to use a relay optical amplifier using the coupled multi-core optical fiber. When a relay optical amplifier of a clad-pumping type using the coupled multi-core optical fiber is used, power consumption of an optical transmission system can be reduced.

However, it is difficult to achieve an optical transmission system by using a relay optical amplifier including the coupled multi-core optical fiber. The reason is that it is very difficult to stabilize optical characteristics of a relay optical amplifier using the coupled multi-core optical fiber. Specifically, the coupled multi-core optical fiber causes large crosstalk between cores, and therefore an output optical signal with respect to an input optical signal of a certain core is randomly changed according to torsion and bending of the coupled multi-core optical fiber and is not stable.

When the coupled multi-core optical fiber is used as a relay optical amplifier, the random behavior may be increased. As a result, basic performance parameters, as a relay optical amplifier, such as a degree of optical amplification (gain) and a noise figure (NF), temporally vary randomly. The degree of optical amplification (gain) and the noise figure (NF) are very important parameters for designing an optical transmission system. In a current optical transmission system, it is assumed that the degree of optical amplification (gain) and the noise figure (NF) are temporally fixed. Therefore, when the degree of optical amplification (gain) and the noise figure (NF) temporally vary randomly, it becomes difficult to use a currently-used design system for an optical transmission system.

In other words, while a multi-core optical fiber transmission system using the coupled multi-core optical fiber has an advantage that a reachable distance of an optical signal can be extended, there is a disadvantage that it is difficult to achieve a stable relay optical amplifier using the coupled multi-core optical fiber. Due to the disadvantage, it is difficult to achieve an effect acquired by using an optical amplifier of a clad-pumping type using a multi-core optical fiber, i.e., an effect of reducing power consumption of an optical transmission system.

In this manner, there is a problem that it is difficult to construct an optical fiber transmission system enabling relay optical amplification using the coupled multi-core optical fiber as an optical transmission path.

An object of the present invention is to provide an optical amplification device, an optical transmission system, and an optical amplification method that solve a problem, being the above-described problem, that it is difficult to construct an optical fiber transmission system enabling relay optical amplification using a coupled multi-core optical fiber as an optical transmission path.

Solution to Problem

An optical amplification device according to the present invention includes: a first optical spatial layout converting means that converts a spatial layout of a plurality of optical signal beams propagating through each of a plurality of cores, from a coupled state in which optical signal beams interfere between a plurality of cores to a non-coupled state in which optical signal beam interference is reduced between a plurality of cores; an optical amplifying means that amplifies, in the non-coupled state, the plurality of optical signal beams with the non-coupled state and generates a plurality of amplified optical signal beams; and a second optical spatial layout converting means that converts a spatial layout of the plurality of amplified optical signal beams from the non-coupled state to the coupled state.

An optical transmission system according to the present invention includes: a first coupled multi-core optical fiber through which a plurality of optical signal beams propagate in a coupled state in which optical signal beams interfere between a plurality of cores; an optical amplifying means that amplifies the plurality of optical signal beams in a non-coupled state in which optical signal beam interference is reduced between a plurality of cores and generates a plurality of amplified optical signal beams; and a second coupled multi-core optical fiber through which the plurality of amplified optical signal beams propagate in the coupled state.

An optical amplification method according to the present invention includes: converting a spatial layout of a plurality of optical signal beams propagating in a coupled state in which optical signal beams interfere between a plurality of cores to a non-coupled state in which optical signal beam interference is reduced between a plurality of cores; amplifying, in the non-coupled state, the plurality of optical signal beams with the non-coupled state and generating a plurality of amplified optical signal beams; and converting a spatial layout of the plurality of amplified optical signal beams from the non-coupled state to the coupled state.

Advantageous Effects of Invention

According to the optical amplification device, the optical transmission system, and the optical amplification method of the present invention, an optical fiber transmission system enabling relay optical amplification using a coupled multi-core optical fiber as an optical transmission path is able to be constructed.

EXAMPLE EMBODIMENT

Hereinafter, with reference to the accompanying drawings, example embodiments according to the present invention are described.

First Example Embodiment

Figure 1:
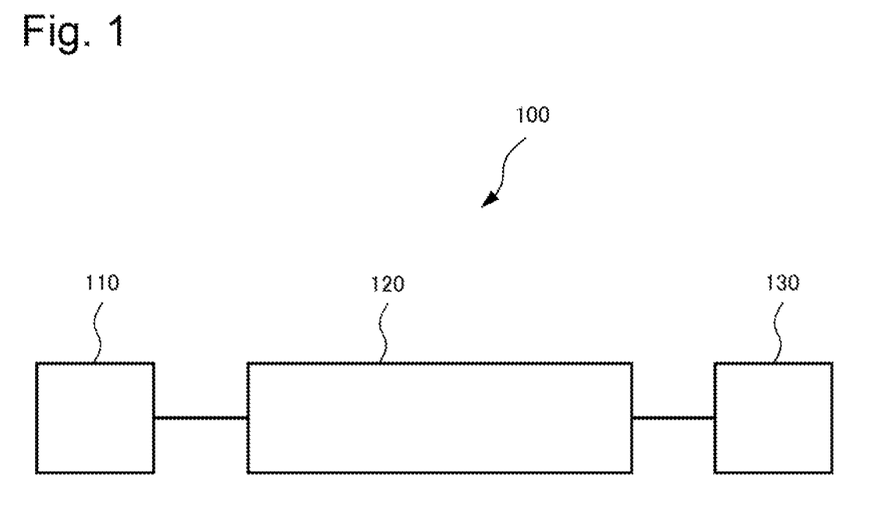
FIG. 1 is a block diagram illustrating a configuration of an optical amplification device according to a first example embodiment of the present invention.

FIG. 1 is a block diagram illustrating a configuration of an optical amplification device 100 according to a first example embodiment of the present invention.

The optical amplification device 100 includes a first optical spatial layout converting means 110, an optical amplifying means 120, and a second optical spatial layout converting means 130. The first optical spatial layout converting means 110 converts a spatial layout of a plurality of optical signal beams propagating through each of a plurality of cores, from a coupled state in which optical signal beams interfere between a plurality of cores to a non-coupled state in which optical signal beam interference is reduced between a plurality of cores. The optical amplifying means 120 amplifies, in the non-coupled state, the plurality of optical signal beams with the non-coupled state and generates a plurality of amplified optical signal beams. The second optical spatial layout converting means 130 converts a spatial layout of the plurality of amplified optical signal beams from the non-coupled state to the coupled state.

In this manner, the optical amplification device 100 according to the present example embodiment includes the first optical spatial layout converting means 110 and the second optical spatial layout converting means 130 and thereby can amplify, in a non-coupled state, a plurality of optical signal beams propagating in a coupled state and thereafter propagate again the plurality of optical signal beams in the coupled state.

Herein, the optical amplifying means 120 can be configured in such a way as to include a non-coupled multi-core optical fiber including a plurality of cores doped with rare-earth ions and a double-clad structure. Without limitation to the above, the optical amplifying means 120 may be configured in such a way as to include a plurality of single-core optical fibers where each of the plurality of single-core optical fibers includes a single core doped with rare-earth ions and a clad surrounding the single core.

Next, an optical amplification method according to the present example embodiment is described.

The optical amplification method according to the present example embodiment first converts a spatial layout of a plurality of optical signal beams propagating in a coupled state in which optical signal beams interfere between a plurality of cores to a non-coupled state in which optical signal beam interference is reduced between a plurality of cores. The method amplifies, in the non-coupled state, the plurality of optical signal beams with the non-coupled state and generates a plurality of amplified optical signal beams. The method converts a spatial layout of the plurality of amplified optical signal beams from the non-coupled state to the coupled state.

As described above, according to the optical amplification device 100 and the optical amplification method of the present example embodiment, a configuration is made in such a way as to amplify, in a non-coupled state, a plurality of optical signal beams propagating in a coupled state. Therefore, in an optical fiber transmission system using a coupled multi-core optical fiber suitable for long-range optical transmission, stable optical amplification can be performed.

Herein, with regard to generation of a plurality of amplified optical signal beams as described above, a configuration including introducing pumping light into a clad of a non-coupled multi-core optical fiber including a plurality of cores doped with rare-earth ions and a clad surrounding the plurality of cores is employable.

In this manner, according to the optical amplification device 100 and the optical amplification method of the present example embodiment, an optical fiber transmission system enabling relay optical amplification using a coupled multi-core optical fiber as an optical transmission path can be constructed.

Second Example Embodiment

Figure 2:
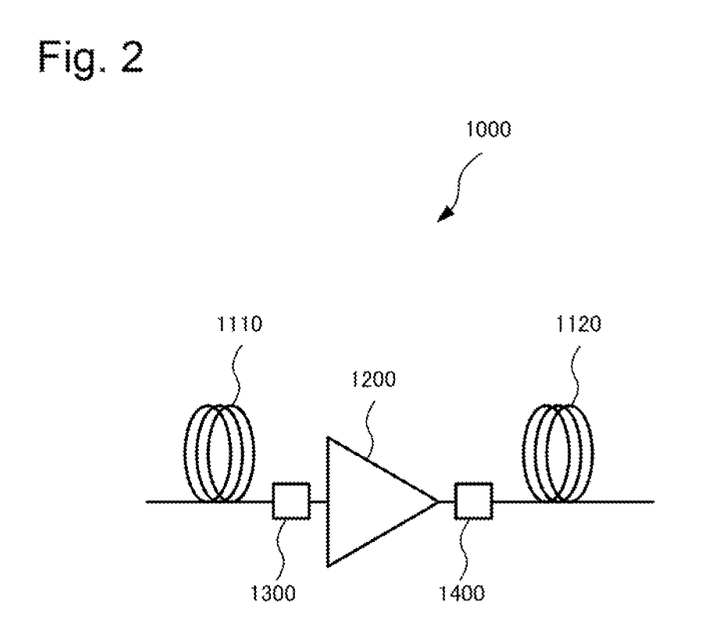
FIG. 2 is a block diagram illustrating a configuration of an optical transmission system according to a second example embodiment of the present invention.

Next, a second example embodiment according to the present invention is described. FIG. 2 illustrates a configuration of an optical transmission system 1000 according to the present example embodiment.

The optical transmission system 1000 according to the present example embodiment includes a first coupled multi-core optical fiber 1110, an optical amplifying means 1200, and a second coupled multi-core optical fiber 1120. The first coupled multi-core optical fiber 1110 propagates a plurality of optical signal beams in a coupled state in which optical signal beams interfere between a plurality of cores. The optical amplifying means 1200 amplifies the plurality of optical signal beams in a non-coupled state in which optical signal beam interference is reduced between a plurality of cores and generates a plurality of amplified optical signal beams. The second coupled multi-core optical fiber 1120 propagates, in the coupled state, the plurality of amplified optical signal beams.

In this manner, according to the optical transmission system 1000 of the present example embodiment, a configuration is made in such a way that a plurality of optical signal beams propagating through the first coupled multi-core optical fiber 1110 in a coupled state are amplified in a non-coupled state by the optical amplifying means 1200. Therefore, in an optical fiber transmission system using a coupled multi-core optical fiber suitable for long-range optical transmission, stable optical amplification can be performed. In other words, according to the optical transmission system 1000 of the present example embodiment, an optical fiber transmission system enabling relay optical amplification using a coupled multi-core optical fiber as an optical transmission path can be constructed.

Herein, the optical amplifying means 1200 can be configured in such a way as to include a non-coupled multi-core optical fiber including a plurality of cores doped with rare-earth ions and a double-clad structure. In other words, as the optical amplifying means 1200, a clad-pumping non-coupled multi-core optical amplifier 1210 can be used.

The optical transmission system 1000 can be configured in such a way as to further include, as illustrated in FIG. 2, a first optical spatial layout converter (first optical spatial layout converting means) 1300 and a second optical spatial layout converter (second optical spatial layout converting means) 1400. Herein, the first optical spatial layout converter (first optical spatial layout converting means) 1300 converts, from a coupled state to a non-coupled state, a spatial layout of a plurality of optical signal beams propagating through the first coupled multi-core optical fiber 1110. The second optical spatial layout converter (second optical spatial layout converting means) 1400 converts, from the non-coupled state to the coupled state, a spatial layout of a plurality of amplified optical signal beams. The first optical spatial layout converter (first optical spatial layout converting means) 1300, the second optical spatial layout converter (second optical spatial layout converting means) 1400, and the optical amplifying means 1200 configure the optical amplification device 100 described according to the first example embodiment.

Figure 3:
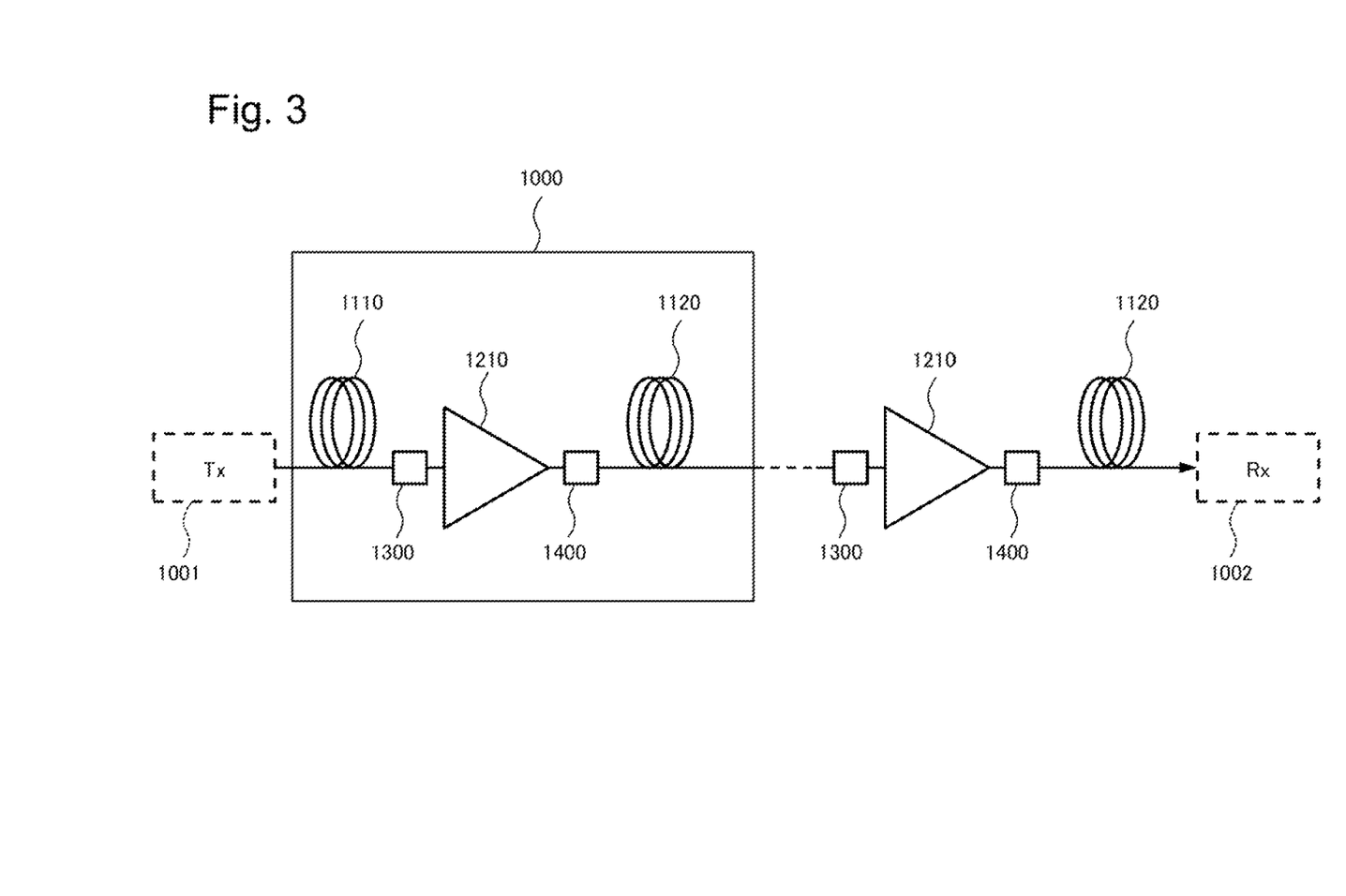
FIG. 3 is a block diagram illustrating a configuration of an optical transmission system according to the second example embodiment of the present invention.

The optical transmission system 1000 transmits, as illustrated in FIG. 3, an optical signal output from an optical transmitter 1001 to an optical receiver 1002. The optical transmitter 1001 outputs optical signals of a plurality of channels. The first coupled multi-core optical fiber 1110 and the second coupled multi-core optical fiber 1120 each include a plurality of cores, accommodate optical signals output from the optical transmitter 1001 in cores with respect to each channel, spatially multiplex the accommodated optical signals, and transmit the multiplexed optical signals.

Herein, both of crosstalk between cores of the first coupled multi-core optical fiber 1110 and crosstalk between cores of the second coupled multi-core optical fiber 1120 can be at a level equal to or more than −15 decibels. In contrast, crosstalk between adjacent cores among a plurality of cores of a non-coupled multi-core optical fiber included in the clad-pumping non-coupled multi-core optical amplifier 1210 can be at a level equal to or less than −20 decibels.

The first coupled multi-core optical fiber 1110 causes a transmission loss, and therefore an intensity of a spatially-multiplexed optical signal to be transmitted is attenuated according to a transmission distance. Therefore, it is necessary to amplify an intensity of a spatially-multiplexed optical signal.

Herein, the first optical spatial layout converter 1300 converts a spatial optical-signal layout of spatially-multiplexed optical signals in such a way that spatially-multiplexed optical signals output from the first coupled multi-core optical fiber 1110 can be input to the clad-pumping non-coupled multi-core optical amplifier 1210. The clad-pumping non-coupled multi-core optical amplifier 1210 amplifies optical intensities of spatially-multiplexed optical signals output from the first optical spatial layout converter 1300 and outputs the amplified spatially-multiplexed optical signals to the second optical spatial layout converter 1400. The second optical spatial layout converter 1400 converts a spatial optical-signal layout of output spatially-multiplexed optical signals in such a way that the spatially-multiplexed optical signals output from the clad-pumping non-coupled multi-core optical amplifier 1210 can be input to the second coupled multi-core optical fiber 1120.

Also in the following, spatially-multiplexed optical signals are propagated by the optical transmission system 1000 through the first coupled multi-core optical fiber 1110 in a coupled state. The spatially-multiplexed optical signal are converted to a non-coupled state by the first optical spatial layout converter 1300 and thereafter, optical intensities attenuated in the first coupled multi-core optical fiber 1110 are amplified in the non-coupled state by the non-coupled multi-core optical amplifier 1210. The spatially-multiplexed optical signals are converted again to the coupled state by the second optical spatial layout converter 1400 and are propagated through the second coupled multi-core optical fiber 1120 in the coupled state. Thereafter, the spatially-multiplexed optical signals are finally received in the optical receiver 1002.

As described above, in the optical transmission system 1000 according to the present example embodiment, a configuration has been made in such a way as to use, as the optical amplifying means 1200, the clad-pumping non-coupled multi-core optical amplifier 1210 including a non-coupled multi-core optical fiber. The clad-pumping non-coupled multi-core optical amplifier 1210 is used, and thereby optical amplification characteristics that are temporally stable can be acquired.

In contrast, when a coupled optical amplifier of a clad-pumping type using a coupled multi-core optical fiber similar to an optical transmission path is formed, a degree of optical amplification (gain) and a noise figure (NF) of the optical amplifier are temporally unstable, and therefore performance of an entire optical transmission system may be degraded. The reason why a degree of optical amplification (gain) and a noise figure (NF) are temporally unstable is that crosstalk between cores inside a coupled optical amplifier of a clad-pumping type is large. Crosstalk between cores varies according to a vibration, bending, and the like of an optical transmission path, and therefore under an actual use condition, it is difficult to predict an occurrence amount, a frequency, and the like of crosstalk. An optical amplifier has non-linearity in an optical amplification process, and therefore crosstalk between cores inside the optical amplifier also has non-linearity. Therefore, it is very difficult to predict and compensate an occurrence amount, a frequency, and the like of crosstalk between cores.

When as an optical transmission path, a coupled multi-core optical fiber is used, it is conceivable that similarly, also in an optical amplifier, a clad-pumping multi-core optical amplifier using a coupled multi-core optical fiber is used. However, according to the present example embodiment, as described above, a configuration including a clad-pumping multi-core optical amplifier using a non-coupled multi-core optical fiber is made, and therefore optical amplification that is temporally stable is made possible. Even when a degree of optical amplification and a noise figure of a clad-pumping multi-core optical amplifier using a coupled multi-core optical fiber can be temporally stabilized, performance as an optical amplifier is not largely different from a case where a non-coupled multi-core optical fiber is used. The reason is that whether to be a coupled multi-core optical fiber and whether to be a non-coupled multi-core optical fiber indicate a difference in a core through which signal light is guided, and with respect to pumping light, either of the above matters is relevant to clad-pumping, resulting in no difference.

As describe above, the optical transmission system 1000 according to the present example embodiment is configured in such a way as to use a coupled multi-core optical fiber as an optical transmission path and a non-coupled multi-core optical fiber as an optical amplification medium included in an optical amplifier.

Figure 4:
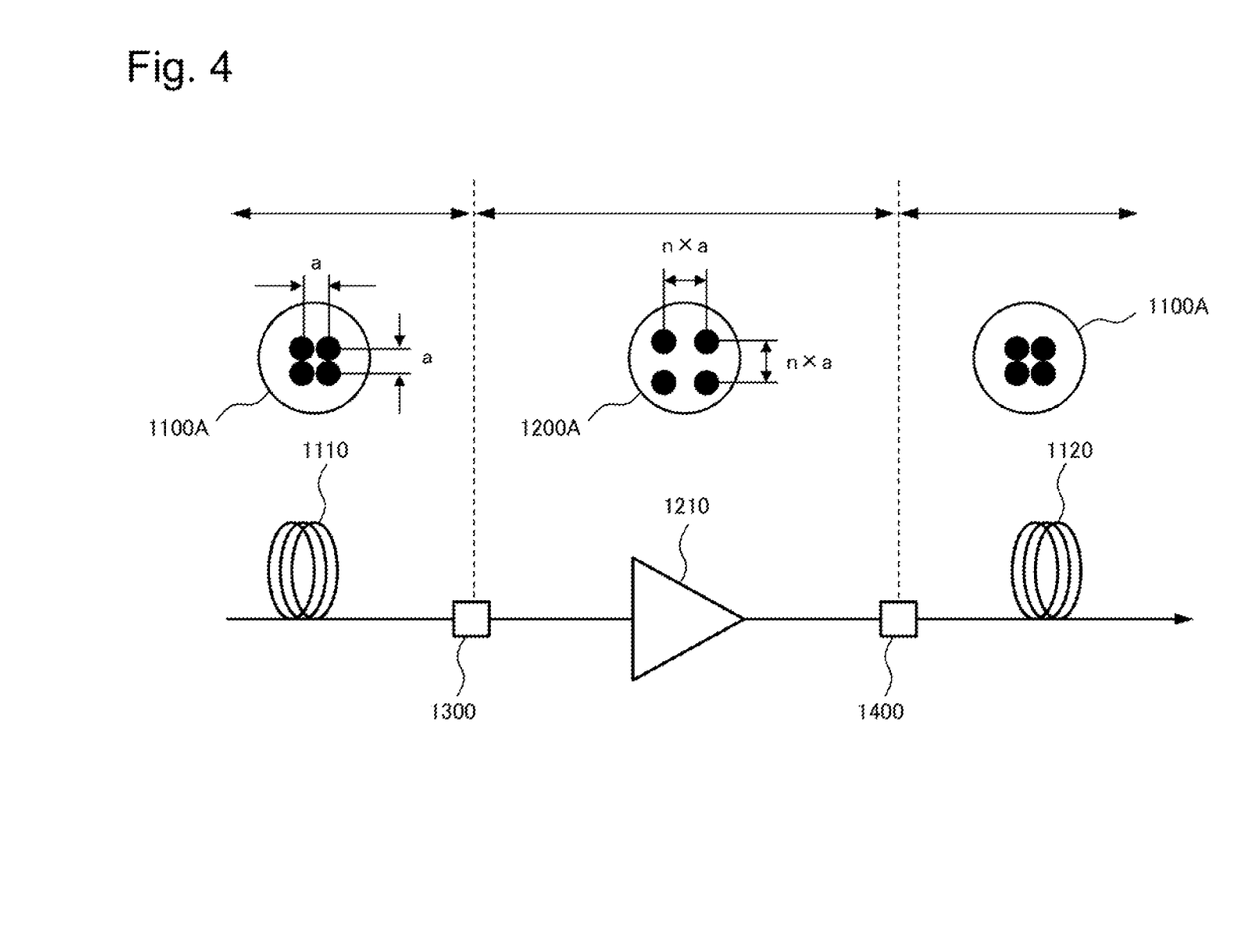
FIG. 4 is a diagram for illustrating a spatial layout of cores of each of a first coupled multi-core optical fiber, a second coupled multi-core optical fiber, and a non-coupled multi-core optical fiber included in a clad-pumping non-coupled multi-core optical amplifier configuring the optical transmission system according to the second example embodiment of the present invention.

Next, by using FIG. 4, a spatial layout of cores of each of the first coupled multi-core optical fiber 1110, the second coupled multi-core optical fiber 1120, and a non-coupled multi-core optical fiber included in the clad-pumping non-coupled multi-core optical amplifier 1210 is described.

In FIG. 4, a cross-section 1100A of each of the first coupled multi-core optical fiber 1110 and the second coupled multi-core optical fiber 1120 being an optical transmission path is illustrated. A distance between adjacent cores is a (a positive real number). In FIG. 4, a case where a multi-core optical fiber having the number of cores of 4 is used is illustrated as an example. A cross-section 1200A of a non-coupled multi-core optical fiber included in the clad-pumping non-coupled multi-core optical amplifier 1210 is illustrated together. In this case, a distance between adjacent cores is n×a. Herein, n is a real number larger than 1. In other words, a configuration is made in such a way that a distance between a plurality of cores of the non-coupled multi-core optical fiber is larger than either of an inter-core distance of the first coupled multi-core optical fiber 1110 and an inter-core distance of the second coupled multi-core optical fiber 1120. Herein, both of the inter-core distance of the first coupled multi-core optical fiber 1110 and the inter-core distance of the second coupled multi-core optical fiber 1120 can be, for example, equal to or less than 25 micrometers ($\mu$m).

As obvious from the cross-section 1100A and the cross-section 1200A, multi-core optical fibers used for an optical transmission path and an optical amplifier are different in a spatial layout of cores. Therefore, it is difficult to directly connect the first coupled multi-core optical fiber 1110 and the second coupled multi-core optical fiber 1120 to the clad-pumping non-coupled multi-core optical amplifier 1210.

Therefore, the optical transmission system 1000 according to the present example embodiment is configured in such a way as to include a first optical spatial layout converter 1300 and a second optical spatial layout converter 1400. Thereby, a spatial layout of a plurality of optical signal beams can be converted in such a way as to be relevant to a spatial layout of cores. Therefore, the first coupled multi-core optical fiber 1110 and the second coupled multi-core optical fiber 1120 can be optically connected to the clad-pumping non-coupled multi-core optical amplifier 1210. As a result, according to the optical transmission system 1000 of the present example embodiment, in an optical transmission system using a coupled multi-core optical fiber as an optical transmission path, a clad-pumping non-coupled multi-core optical amplifier can be used.

Next, the first optical spatial layout converter 1300 and the second optical spatial layout converter 1400 are described in more detail.

Figure 5:
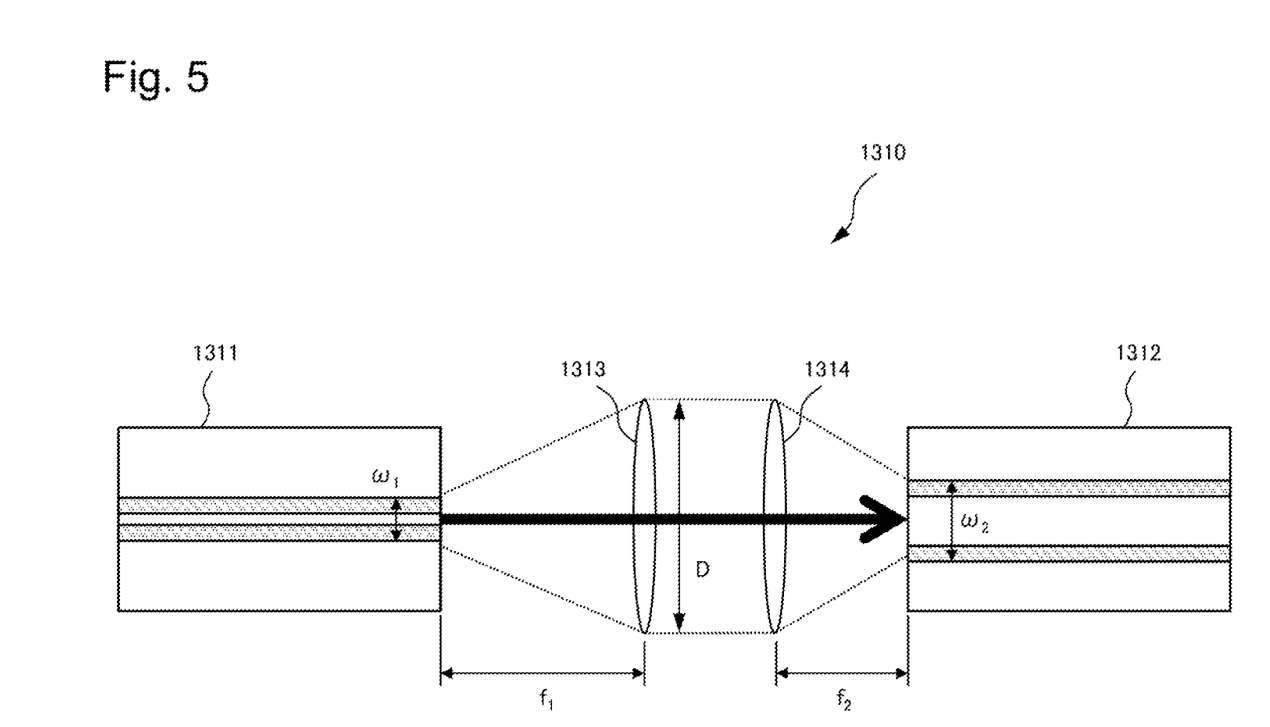
FIG. 5 is a diagram illustrating a configuration of a first optical spatial layout converter included in the optical transmission system according to the second example embodiment of the present invention.

FIG. 5 illustrates one example of a configuration of a first optical spatial layout converter (first optical spatial layout converting means) 1310 including a lens optical system. The first optical spatial layout converter 1310 includes a coupled multi-core optical fiber 1311 and a first lens 1313 on an input side and a non-coupled multi-core optical fiber 1312 and a second lens 1314 on an output side.

A spatial layout of cores of the coupled multi-core optical fiber 1311 is the same as a spatial layout (see the cross-section 1100A in FIG. 4) of cores of the first coupled multi-core optical fiber 1110 configuring an optical transmission path. An inter-core distance is designated as $\omega 1$. A spatial layout of cores of the non-coupled multi-core optical fiber 1312 is the same as a spatial layout (see the cross-section 1200A in FIG. 4) of the non-coupled multi-core optical fiber included in the clad-pumping non-coupled multi-core optical amplifier 1210. An inter-core distance is designated as $\omega 2$. As described here, a distance between a plurality of cores of a non-coupled multi-core optical fiber is configured in such a way as to be larger than an inter-core distance of the first coupled multi-core optical fiber 1110, and therefore a relation of $\omega 1 < \omega 2$ is established. It is assumed that values of numerical aperture (NA) of the coupled multi-core optical fiber 1311 and the non-coupled multi-core optical fiber 1312 are the same.

The first lens 1313 on an input side has the same value of numerical aperture (NA) as the coupled multi-core optical fiber 1311 and the non-coupled multi-core optical fiber 1312, and a diameter is designated as D and a focal length is designated as f1. The first lens 1313 converts emitted light from the coupled multi-core optical fiber 1311 to parallel light. In general, among a beam diameter $\omega$, a wavelength $\lambda$, a focal length f, and a lens diameter D, a relation of $\omega = (4\lambda f)/(\pi D)$ is established. Based on the relation, the first lens 1313 can be designed in such a way that all pieces of emitted light from the coupled multi-core optical fiber 1311 are converted to parallel light.

The second lens 1314 on an output side has the same numerical aperture (NA) and diameter D as the first lens 1313, and a focal length is f2. The second lens 1314 collects parallel light emitted from the first lens 1313 in such a way that a beam diameter is $\omega 2$ on an input end surface of the non-coupled multi-core optical fiber 1312. The beam diameter is the same as an inter-core distance of the non-coupled multi-core optical fiber 1312. Also in this case, a relation of $\omega = (4\lambda f)/(\pi D)$ is established. Therefore, a focal length f2 (f1>f2) of the second lens 1314 can be designed in such a way that all pieces of parallel light are collected in the non-coupled multi-core optical fiber 1312 at a beam diameter of $\omega 2$ by the second lens 1314.

When a lens optical system configured in this manner is used, a spatial layout of spatially-multiplexed optical signal beams can be converted in such a way as to be relevant to a core layout of each of the coupled multi-core optical fiber 1311 and the non-coupled multi-core optical fiber 1312. Specifically, the first optical spatial layout converter 1310 executes expansion conversion in such a way as to expand, to n times, an inter-beam distance of spatially-multiplexed optical signals relevant to an inter-core distance $\omega 1 = a$ of the coupled multi-core optical fiber 1311 and match the inter-beam distance with an inter-core distance $\omega 2 = n \times a$ of the non-coupled multi-core optical fiber 1312.

The second optical spatial layout converter 1400 converts, in an opposite manner to the first optical spatial layout converter 1300, a spatial layout of spatially-multiplexed optical signal beams emitted from a non-coupled multi-core optical fiber in such a way as to be coupled with a coupled multi-core optical fiber. Specifically, a second optical spatial layout converter having a configuration in which input and output of the first optical spatial layout converter 1310 are reversed can be used. The second optical spatial layout converter executes conversion in such a way as to reduce an inter-core distance to $\omega 2 = n \times a$ of the non-coupled multi-core optical fiber 1312 to 1/n times and match the inter-core distance with an inter-core distance $\omega 1 = a$ of the coupled multi-core optical fiber 1311.

Figure 6:
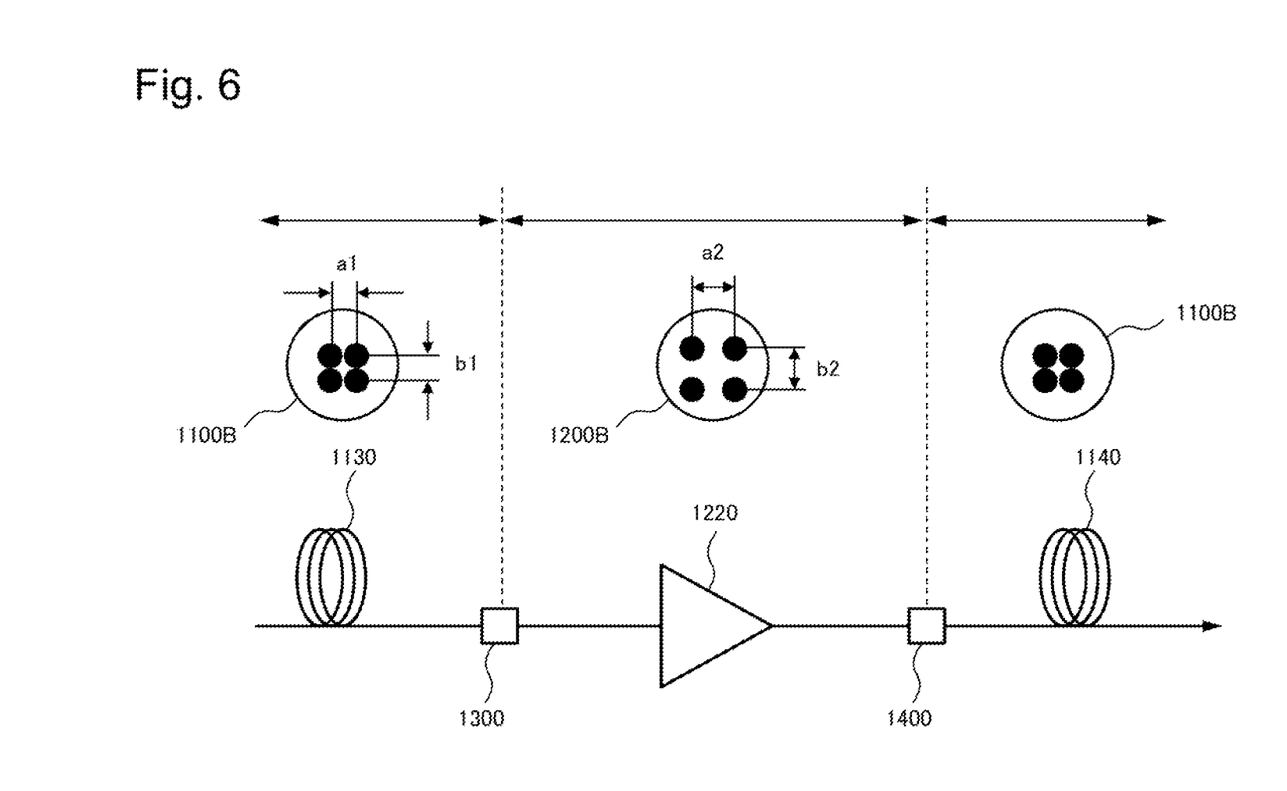
FIG. 6 is a diagram for illustrating a spatial layout of cores of each of another first coupled multi-core optical fiber, another second coupled multi-core optical fiber, and another non-coupled multi-core optical fiber included in a clad-pumping non-coupled multi-core optical amplifier configuring the optical transmission system according to the second example embodiment of the present invention.

Next, by using FIG. 6, another multi-core optical fiber configuring the optical transmission system 1000 is described. There is a difference from the configuration of the multi-core optical fiber illustrated in FIG. 4 in an inter-core distance of each of multi-core optical fibers. In the configuration of the multi-core optical fiber illustrated in FIG. 4, it has been assumed that any of distances of adjacent cores in multi-core optical fibers is equal (a or n×a), but it is assumed that in a configuration of a multi-core optical fiber illustrated in FIG. 6, inter-core distances are different from each other.

In FIG. 6, a cross-section 1100B of each of the first coupled multi-core optical fiber 1130 and the second coupled multi-core optical fiber 1140 being an optical transmission path is illustrated. Distances between adjacent cores are a1 and b1 (a1 and b1 each are a positive real number wherein a1≠b1). A cross-section 1200B of a non-coupled multi-core optical fiber included in the clad-pumping non-coupled multi-core optical amplifier 1220 is illustrated together. In this case, distances between adjacent cores are a2 and b2 (a2 and b2 each are a positive real number wherein a2$b$2).

The first optical spatial layout converter 1310 including a lens optical system illustrated in FIG. 5 can merely execute conversion to uniform expansion or reduction of a spatial layout of optical signal beams. Therefore, as in the multi-core optical fiber illustrated in FIG. 6, when an inter-core distance is not fixed, it is difficult to use the first optical spatial layout converter 1310. Therefore, in the optical transmission system illustrated in FIG. 6, a configuration is made in such a way as to use an optical spatial layout converting means including a mirror optical system.

Figure 7:
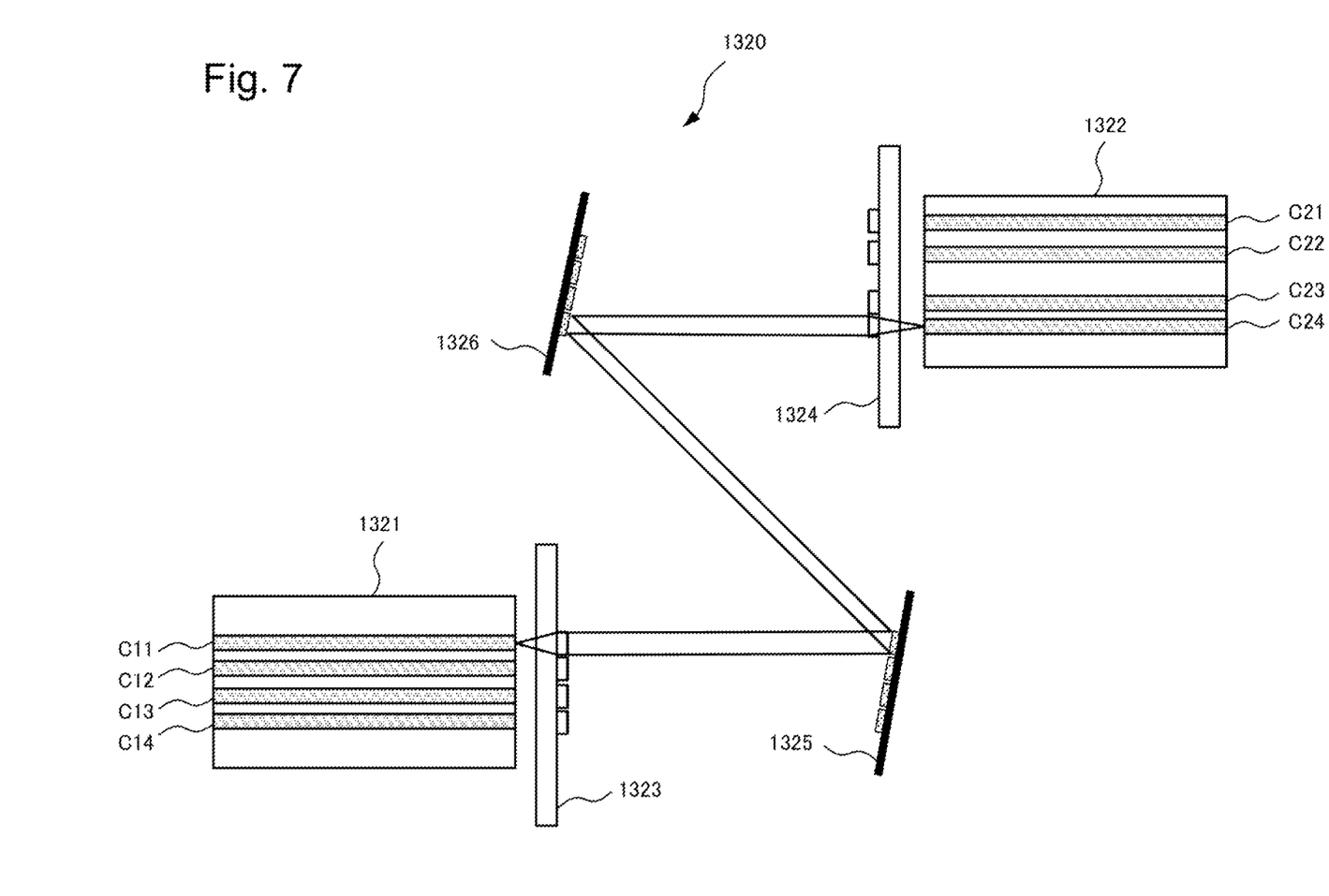
FIG. 7 is a diagram illustrating another configuration of the first optical spatial layout converter included in the optical transmission system according to the second example embodiment of the present invention.

FIG. 7 illustrates one example of a configuration of a first optical spatial layout converter (first optical spatial layout converting means) 1320 including a mirror optical system. FIG. 7 illustrates a configuration example including an optical switch using a movable mirror applied with a micro electro mechanical systems (MEMS) technique. When the MEMS technique is used, a spatial layout of spatially-multiplexed optical signal beams propagating through a multi-core optical fiber can be converted in any manner.

The first optical spatial layout converter 1320 includes a coupled multi-core optical fiber 1321 and a first lens array 1323 on an input side, and a non-coupled multi-core optical fiber 1322 and a second lens array 1324 on an output side. In addition, the first optical spatial layout converter 1320 is configured in such a way as to include a first mirror array 1325 and a second mirror array 1326 between the first lens array 1323 and the second lens array 1324.

An operation of the first optical spatial layout converter 1320 is described by using, as an example, optical signal beams emitted from a core C11 included in the coupled multi-core optical fiber 1321.

Optical signal beams emitted from the core C11 are converted to parallel light by the first lens array 1323. Herein, lenses (four lenses in the example illustrated in FIG. 4) included in the first lens array 1323 are configured in such a way as to be matched with each of cores (C11 to C14 in the example illustrated in FIG. 7) of the coupled multi-core optical fiber 1321, with respect to a spatial layout. The optical signal beams are reflected by the first mirror array 1325 and the second mirror array 1326. Reflection angles of the mirrors included in the first mirror array 1325 and the second mirror array 1326 can be adjusted independently of each other.

Optical signal beams reflected by the second mirror array 1326 enter the second lens array 1324. Lenses included in the second lens array 1324 are disposed in such a way as to be matched with a core layout of the non-coupled multi-core optical fiber 1322. As described above, reflection angles of mirrors included in the first mirror array 1325 and the second mirror array 1326 can be adjusted independently of each other. Therefore, each of the reflection angles can be adjusted in such a way that among cores (four cores of C21 to C24 in the example illustrated in FIG. 7) included in the non-coupled multi-core optical fiber 1322, an optical signal beam enters any one of the cores (C24 in the example illustrated in FIG. 7). Specifically, for example, an output optical intensity of the core C24 is monitored and a reflection angle of each of the mirrors included in the first mirror array 1325 and the second mirror array 1326 is adjusted in such a way that the output optical intensity is maximized. Thereby, an optical signal beam can be input to the core C24 of the non-coupled multi-core optical fiber 1322.

Also, with regard to the second optical spatial layout converter 1400, a second optical spatial layout converter configured in such way that input and output of the first optical spatial layout converter 1320 are reversed can be used.

As described above, according to the optical transmission system of the present example embodiment, a coupled multi-core optical fiber where a plurality of cores are disposed in any spatial position and a non-coupled multi-core optical fiber included in a clad-pumping non-coupled multi-core optical amplifier can be optically connected. Therefore, an optical fiber transmission system enabling relay optical amplification using a coupled multi-core optical fiber as an optical transmission path can be constructed.

In the above description, a configuration including a lens optical system or a mirror optical system has been described as the first optical spatial layout converter (first optical spatial layout converting means) 1300 or the second optical spatial layout converter (second optical spatial layout converting means) 1400. However, without limitation to the configuration, a configuration using the first optical spatial layout converter (first optical spatial layout converting means) 1300 including a spatial optical modulator or the second optical spatial layout converter (second optical spatial layout converting means) 1400 including a spatial optical modulator may be made.

Third Example Embodiment

Figure 8:
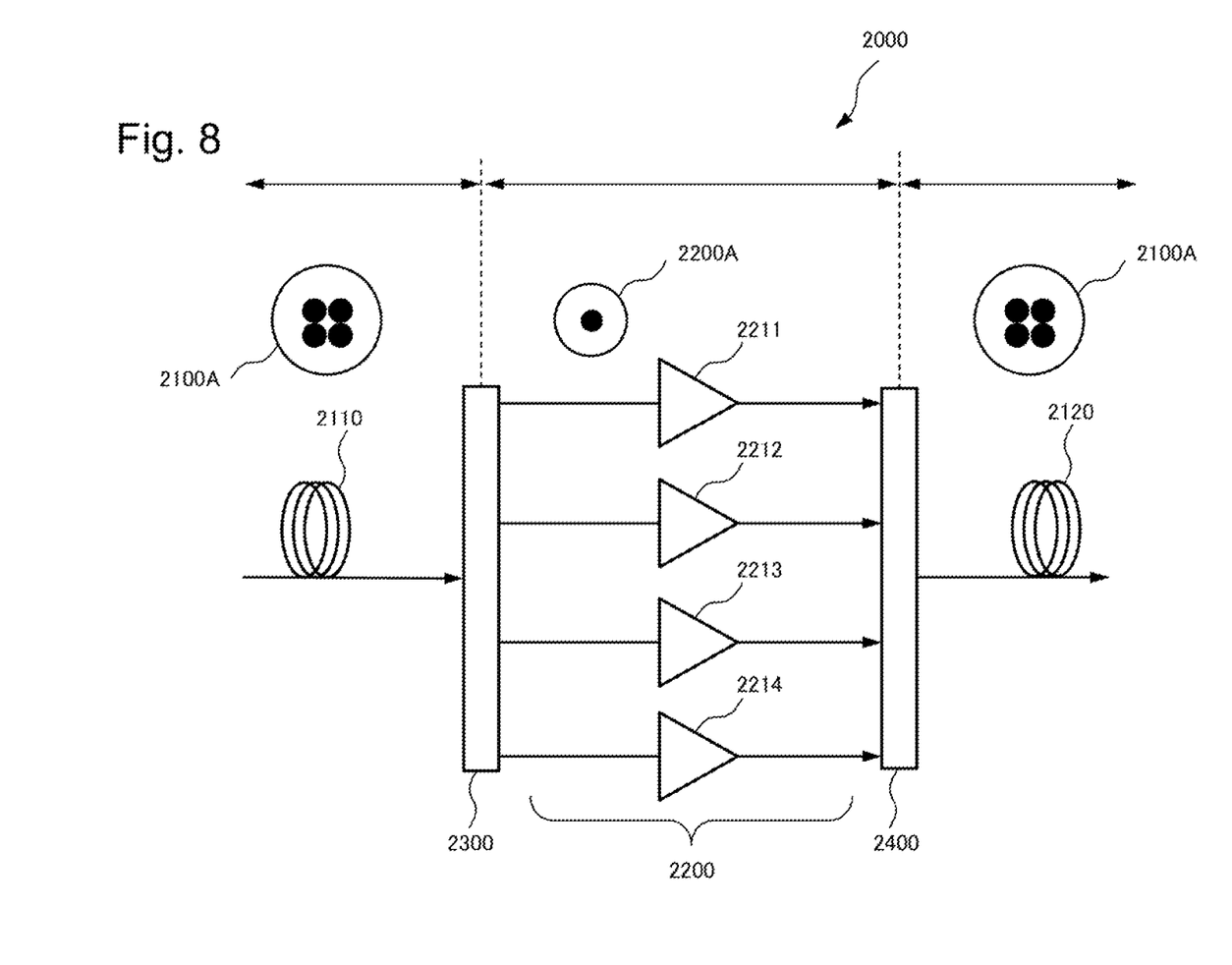
FIG. 8 is a block diagram illustrating a configuration of an optical transmission system according to a third example embodiment of the present invention.

Next, a third example embodiment according to the present invention is described. In FIG. 8, an optical transmission system 2000 according to the present example embodiment is illustrated.

The optical transmission system 2000 according to the present example embodiment includes a first coupled multi-core optical fiber 2110, an optical amplifier (optical amplifying means) 2200, and a second coupled multi-core optical fiber 2120. The first coupled multi-core optical fiber 2110 propagates a plurality of optical signal beams in a coupled state in which optical signal beams interfere between a plurality of cores. The optical amplifier 2200 amplifies the plurality of optical signal beams in a non-coupled state in which optical signal beam interference is reduced between a plurality of cores and generates a plurality of amplified optical signal beams. The second coupled multi-core optical fiber 2120 propagates the plurality of amplified optical signal beams in the coupled state.

The optical transmission system 2000 according the present example embodiment is different from the optical transmission system 1000 according the second example embodiment in a configuration of the optical amplifier (optical amplifying means) 2200. In the optical transmission system 2000 according the present example embodiment, a configuration including, as the optical amplifier (optical amplifying means) 2200, a plurality of core-pumping optical amplifiers is made. In other words, the optical amplifier (optical amplifying means) 2200 is configured in such a way that a plurality of single-core optical fibers are included and each of the plurality of single-core optical fibers includes a single core doped with rare-earth ions and a clad surrounding the signal core. In FIG. 8, a configuration including four core-pumping optical amplifiers 2211 to 2214 is illustrated as an example. In FIG. 8, a cross-section 2100A of each of the first coupled multi-core optical fiber 2110 and the second coupled multi-core optical fiber 2120 being an optical transmission path and a cross-section 2200A of a single-core optical fiber configuring the optical amplifier 2200 are illustrated.

The optical transmission system 2000 can be configured, as illustrated in FIG. 8, in such a way as to further include a first optical spatial layout converter (first optical spatial layout converting means) 2300 and a second optical spatial layout converter (second optical spatial layout converting means) 2400. Herein, the first optical spatial layout converter (first optical spatial layout converting means) 2300 converts, from a coupled state to a non-coupled state, a spatial layout of a plurality of optical signal beams propagating through the first coupled multi-core optical fiber 2110. The second optical spatial layout converter (second optical spatial layout converting means) 2400 converts, from a non-coupled state to a coupled state, a spatial layout of a plurality of amplified optical signal beams The first optical spatial layout converter (first optical spatial layout converting means) 2300, the second optical spatial layout converter (second optical spatial layout converting means) 2400, and the optical amplifier (optical amplifying means) 2200 configure the optical amplification device described according to the first example embodiment.

In the optical transmission system 2000 according to the present example embodiment, the first optical spatial layout converter (first optical spatial layout converting means) 2300 and the second optical spatial layout converter (second optical spatial layout converting means) 2400 are configured in such a way as to include a fan-in fan-out (FIFO) connecting means. The fan-in fan-out (FIFO) connecting means connects cores of the first coupled multi-core optical fiber 2110 and the second coupled multi-core optical fiber 2120 to a plurality of single-core optical fibers configuring the optical amplifier 2200. As the fan-in fan-out (FIFO) connecting means, fiber-bundle-type FIFO and fusion drawing-type FIFO can be used. In addition, spatial optical-type FIFO and planar optical waveguide-type FIFO may be used.

As described above, in the optical transmission system 2000 according to the present example embodiment, a configuration is made in such a way that a plurality of optical signal beams propagating through the first coupled multi-core optical fiber 2110 in a coupled state are amplified by the optical amplifier 2200 in a non-coupled state. Therefore, in an optical fiber transmission system using a coupled multi-core optical fiber suitable for long-range optical transmission, stable optical amplification can be performed. In other words, according to the optical transmission system 2000 of the present example embodiment, an optical fiber transmission system enabling relay optical amplification using a coupled multi-core optical fiber as an optical transmission path can be constructed.

According to the optical transmission system 2000 of the present example embodiment, an existing single-core/ single-mode optical amplifier can be directly used, and therefore an optical transmission system can be inexpensively configured.

The whole or part of the example embodiments disclosed above can be described as, but not limited to, the following supplementary notes.

(Supplementary note 1) An optical amplification device including: a first optical spatial layout converting means that converts a spatial layout of a plurality of optical signal beams propagating through each of a plurality of cores, from a coupled state in which optical signal beams interfere between a plurality of cores to a non-coupled state in which optical signal beam interference is reduced between a plurality of cores; an optical amplifying means that amplifies, in the non-coupled state, the plurality of optical signal beams with the non-coupled state and generates a plurality of amplified optical signal beams; and a second optical spatial layout converting means that converts a spatial layout of the plurality of amplified optical signal beams from the non-coupled state to the coupled state.

(Supplementary note 2) The optical amplification device according to supplementary note 1, wherein the optical amplifying means includes a non-coupled multi-core optical fiber including a plurality of cores doped with rare-earth ions and a double-clad structure.

(Supplementary note 3) The optical amplification device according to supplementary note 1 or 2, wherein at least one of the first optical spatial layout converting means and the second optical spatial layout converting means includes a lens optical system.

(Supplementary note 4) The optical amplification device according to supplementary note 1 or 2, wherein at least one of the first optical spatial layout converting means and the second optical spatial layout converting means includes a mirror optical system.

(Supplementary note 5) The optical amplification device according to supplementary note 1, wherein the optical amplifying means includes a plurality of single-core optical fibers and each of the plurality of single-core optical fibers includes a single core doped with rare-earth ions and a clad surrounding the single core.

(Supplementary note 6) The optical amplification device according to supplementary note 5, wherein the first optical spatial layout converting means and the second optical spatial layout converting means each include a fan-in fan-out connecting means.

(Supplementary note 7) An optical transmission system including: a first coupled multi-core optical fiber through which a plurality of optical signal beams propagate in a coupled state in which optical signal beams interfere between a plurality of cores; an optical amplifying means that amplifies the plurality of optical signal beams in a non-coupled state in which optical signal beam interference is reduced between a plurality of cores and generates a plurality of amplified optical signal beams; and a second coupled multi-core optical fiber through which the plurality of amplified optical signal beams propagate in the coupled state.

(Supplementary note 8) The optical transmission system according to supplementary note 7, wherein the optical amplifying means includes a non-coupled multi-core optical fiber including a plurality of cores doped with rare-earth ions and a double-clad structure.

(Supplementary note 9) The optical transmission system according to supplementary note 8, wherein a distance between the plurality of cores of the non-coupled multi-core optical fiber is larger than either of an inter-core distance of the first coupled multi-core optical fiber and an inter-core distance of the second coupled multi-core optical fiber.

(Supplementary note 10) An optical amplification method including: converting a spatial layout of a plurality of optical signal beams propagating in a coupled state in which optical signal beams interfere between a plurality of cores to a non-coupled state in which optical signal beam interference is reduced between a plurality of cores; amplifying, in the non-coupled state, the plurality of optical signal beams with the non-coupled state and generating a plurality of amplified optical signal beams; and converting a spatial layout of the plurality of amplified optical signal beams from the non-coupled state to the coupled state.

(Supplementary note 11) The optical amplification device according to supplementary note 1 or 2, wherein at least one of the first optical spatial layout converting means and the second optical spatial layout converting means includes a spatial optical modulator.

(Supplementary note 12) The optical amplification device according to supplementary note 2, wherein crosstalk between adjacent cores among the plurality of cores of the non-coupled multi-core optical fiber is equal to or less than −20 decibels.

(Supplementary note 13) The optical transmission system according to any one of supplementary notes 7, 8, and 9, further including: a first optical spatial layout converting means that converts, from the coupled state to the non-coupled state, a spatial layout of the plurality of optical signal beams propagating through the first coupled multi-core optical fiber; and a second optical spatial layout converting means that converts a spatial layout of the plurality of amplified optical signal beams from the non-coupled state to the coupled state.

(Supplementary note 14) The optical transmission system according to supplementary note 13, wherein at least one of the first optical spatial layout converting means and the second optical spatial layout converting means includes a lens optical system.

(Supplementary note 15) The optical transmission system according to supplementary note 13, wherein at least one of the first optical spatial layout converting means and the second optical spatial layout converting means includes a mirror optical system.

(Supplementary note 16) The optical transmission system according to supplementary note 13, wherein at least one of the first optical spatial layout converting means and the second optical spatial layout converting means includes a spatial optical modulator.

(Supplementary note 17) The optical transmission system according to supplementary note 8, wherein crosstalk between adjacent cores among the plurality of cores of the non-coupled multi-core optical fiber is equal to or less than −20 decibels.

(Supplementary note 18) The optical transmission system according to any one of supplementary notes 7, 8, 9, 13, 14, 15, 16, and 17, wherein both of an inter-core distance of the first coupled multi-core optical fiber and an inter-core distance of the second coupled multi-core optical fiber are equal to or less than 25 micrometers.

(Supplementary note 19) The optical transmission system according to any one of supplementary notes 7, 8, 9, 13, 14, 15, 16, and 17, wherein both of crosstalk between cores of the first coupled multi-core optical fiber and crosstalk between cores of the second coupled multi-core optical fiber are equal to or more than −15 decibels.

(Supplementary note 20) The optical amplification method according to supplementary note 10, wherein the generating of the plurality of amplified optical signal beams includes introducing pumping light into a clad included in a non-coupled multi-core optical fiber including a plurality of cores doped with rare-earth ions, the clad surrounding the plurality of cores.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-073237, filed on Apr. 8, 2019, the disclosure of which is incorporated herein in its entirety by reference.

REFERENCE SIGNS LIST

100 Optical amplification device
110 First optical spatial layout converting means
120, 1200 Optical amplifying means
130 Second optical spatial layout converting means
1000, 2000 Optical transmission system
1001 Optical transmitter
1002 Optical receiver
1110, 1130, 2110 First coupled multi-core optical fiber
1120, 1140, 2120 Second coupled multi-core optical fiber
1210, 1220 Clad-pumping non-coupled multi-core optical amplifier
1300, 1310, 1320, 2300 First optical spatial layout converter
1311, 1321 Coupled multi-core optical fiber
1312, 1322 Non-coupled multi-core optical fiber
1313 First lens
1314 Second lens
1323 First lens array
1324 Second lens array
1325 First mirror array
1326 Second mirror array
1400, 2400 Second optical spatial layout converter
2200 Optical amplifier
2211 to 2214 Core-pumping optical amplifier
1100A, 1200A, 1100B, 1200B, 2100A, 2200A Cross-section
C11 to C14, C21 to C24 Core

What is claimed is:
1. An optical amplification device comprising:
a first optical spatial layout converting unit configured to convert a spatial layout of a plurality of optical signal beams propagating through each of a plurality of cores, from a coupled state in which optical signal beams interfere between a plurality of cores to a non-coupled state in which optical signal beam interference is reduced between a plurality of cores;
an optical amplifying unit configured to amplify, in the non-coupled state, the plurality of optical signal beams with the non-coupled state and generate a plurality of amplified optical signal beams; and
a second optical spatial layout converting unit configured to convert a spatial layout of the plurality of amplified optical signal beams from the non-coupled state to the coupled state.
2. The optical amplification device according to claim 1, wherein the optical amplifying unit includes a non-coupled multi-core optical fiber including a plurality of cores doped with rare-earth ions and a double-clad structure.

3. The optical amplification device according to claim 1, wherein
at least one of the first optical spatial layout converting unit and the second optical spatial layout converting unit includes a lens optical system.

4. The optical amplification device according to claim 1, wherein
at least one of the first optical spatial layout converting unit and the second optical spatial layout converting unit includes a mirror optical system.

5. The optical amplification device according to claim 1, wherein
the optical amplifying unit includes a plurality of single-core optical fibers and each of the plurality of single-core optical fibers includes a single core doped with rare-earth ions and a clad surrounding the single core.

6. The optical amplification device according to claim 5, wherein
the first optical spatial layout converting unit and the second optical spatial layout converting unit each include fan-in fan-out connecting means.

7. An optical transmission system comprising:
a first coupled multi-core optical fiber through which a plurality of optical signal beams propagate in a coupled state in which optical signal beams interfere between a plurality of cores;
an optical amplifying unit configured to amplify the plurality of optical signal beams in a non-coupled state in which optical signal beam interference is reduced between a plurality of cores and generate a plurality of amplified optical signal beams; and
a second coupled multi-core optical fiber through which the plurality of amplified optical signal beams propagate in the coupled state.

8. The optical transmission system according to claim 7, wherein
the optical amplifying unit includes a non-coupled multi-core optical fiber including a plurality of cores doped with rare-earth ions and a double-clad structure.

9. The optical transmission system according to claim 8, wherein
a distance between the plurality of cores of the non-coupled multi-core optical fiber is larger than either of an inter-core distance of the first coupled multi-core optical fiber and an inter-core distance of the second coupled multi-core optical fiber.

10. An optical amplification method comprising:
converting a spatial layout of a plurality of optical signal beams propagating in a coupled state in which optical signal beams interfere between a plurality of cores to a non-coupled state in which optical signal beam interference is reduced between a plurality of cores;
amplifying, in the non-coupled state, the plurality of optical signal beams with the non-coupled state and generating a plurality of amplified optical signal beams; and
converting a spatial layout of the plurality of amplified optical signal beams from the non-coupled state to the coupled state.

11. The optical amplification device according to claim 1, wherein
at least one of the first optical spatial layout converting unit and the second optical spatial layout converting unit includes a spatial optical modulator.

12. The optical amplification device according to claim 2, wherein
crosstalk between adjacent cores among the plurality of cores of the non-coupled multi-core optical fiber is equal to or less than −20 decibels.

13. The optical transmission system according to claim 7, further comprising:
a first optical spatial layout converting unit configured to convert, from the coupled state to the non-coupled state, a spatial layout of the plurality of optical signal beams propagating through the first coupled multi-core optical fiber; and
a second optical spatial layout converting unit configured to convert a spatial layout of the plurality of amplified optical signal beams from the non-coupled state to the coupled state.

14. The optical transmission system according to claim 13, wherein
at least one of the first optical spatial layout converting unit and the second optical spatial layout converting unit includes a lens optical system.

15. The optical transmission system according to claim 13, wherein
at least one of the first optical spatial layout converting unit and the second optical spatial layout converting unit includes a mirror optical system.

16. The optical transmission system according to claim 13, wherein
at least one of the first optical spatial layout converting unit and the second optical spatial layout converting unit includes a spatial optical modulator.

17. The optical transmission system according to claim 8, wherein
crosstalk between adjacent cores among the plurality of cores of the non-coupled multi-core optical fiber is equal to or less than −20 decibels.

18. The optical transmission system according to claim 7, wherein
both of an inter-core distance of the first coupled multi-core optical fiber and an inter-core distance of the second coupled multi-core optical fiber are equal to or less than 25 micrometers.

19. The optical transmission system according to claim 7, wherein
both of crosstalk between cores of the first coupled multi-core optical fiber and crosstalk between cores of the second coupled multi-core optical fiber are equal to or more than −15 decibels.

20. The optical amplification method according to claim 10, wherein
the generating of the plurality of amplified optical signal beams includes introducing pumping light into a clad included in a non-coupled multi-core optical fiber including a plurality of cores doped with rare-earth ions, the clad surrounding the plurality of cores.

* * * * *